(12) United States Patent
Takenaka

(10) Patent No.: US 6,695,736 B2
(45) Date of Patent: Feb. 24, 2004

(54) HYBRID DRIVE APPARATUS WITH INDEPENDENT OUTPUT DISTRIBUTION

(75) Inventor: Masayuki Takenaka, Anjo (JP)

(73) Assignee: Aisin AW. Co, Ltd., Anjo (JP)

( * ) Notice: Subject to any disclaimer, the term of this patent is extended or adjusted under 35 U.S.C. 154(b) by 0 days.

(21) Appl. No.: 09/731,918

(22) Filed: Dec. 8, 2000

(65) Prior Publication Data

US 2001/0006919 A1 Jul. 5, 2001

(30) Foreign Application Priority Data

Dec. 27, 1999 (JP) ............................................. 11-371847

(51) Int. Cl.[7] .............................................. F16H 37/06
(52) U.S. Cl. ........................ 475/5; 477/3; 477/4; 477/5
(58) Field of Search ........................ 475/5, 221; 477/3, 477/4, 5; 180/65.4, 65.6; 290/45, 32

(56) References Cited

U.S. PATENT DOCUMENTS

| | | | | |
|---|---|---|---|---|
| 5,433,282 A | * | 7/1995 | Moroto et al. ............. | 180/65.2 |
| 5,643,119 A | * | 7/1997 | Yamaguchi et al. ........ | 180/65.2 |
| 5,775,449 A | * | 7/1998 | Moroto et al. ............. | 180/65.2 |
| 5,791,427 A | * | 8/1998 | Yamaguchi ................. | 180/165 |
| 5,799,744 A | * | 9/1998 | Yamaguchi et al. ........ | 180/65.2 |
| 5,806,617 A | * | 9/1998 | Yamaguchi ................. | 180/65.2 |
| 5,823,281 A | * | 10/1998 | Yamaguchi et al. ........ | 180/65.2 |
| 5,823,282 A | * | 10/1998 | Yamaguchi ................. | 180/65.2 |
| 6,053,842 A | * | 4/2000 | Kitada et al. .............. | 180/65.4 |

FOREIGN PATENT DOCUMENTS

JP  A-8-183347  7/1996

* cited by examiner

Primary Examiner—Rodney H. Bonck
Assistant Examiner—David D. Le
(74) Attorney, Agent, or Firm—Oliff & Berridge, PLC

(57) ABSTRACT

A hybrid four-axis drive apparatus has an engine and a generator on a first axis, a motor on a second axis, a counter gear mechanism on a third axis, and a differential device on a fourth axis. The engine and the generator are connected to the countershaft through a differential gear device. The differential gear device and the countershaft are connected by a first pair of gears. The motor and the countershaft are directly connected by a second pair of gears. The countershaft and the differential device are directly connected by a third pair of gears. Therefore, it becomes possible to change the gear ratio of the pair of gears without changing the positions of the four axes relative to one another. At least one embodiment of the invention has the motor disposed on the first axis, thus, reducing the number of axes to three.

17 Claims, 7 Drawing Sheets

HYBRID DRIVE APPARATUS WITH INDEPENDENT OUTPUT DISTRIBUTION

INCORPORATION BY REFERENCE

The disclosure of Japanese Patent Application No. HEI 11-371, 847 filed on Dec. 27, 1999, including the specification, drawings and abstract, is incorporated herein by reference in its entirety.

BACKGROUND OF THE INVENTION

1. Field of the Invention

The invention relates to a hybrid drive apparatus that uses a combustion engine and an electric motor as power sources and, more particularly, to connecting structures between axes in a hybrid drive apparatus.

2. Description of the Related Art

Hybrid drive apparatuses that use a combustion engine (hereinafter referred to as "engine") and an electric motor (hereinafter referred to as "motor") as power sources allow various power train arrangements as power from each power source may be transmitted to a differential device in a number of ways. Among such apparatuses, a drive apparatus having a structure that is excellent in the respect of transmitting output from the engine and output from the electric motor to a differential device with an arbitrary gear ratio set is disclosed in the Japanese Patent Application Laid-Open No. HEI 8-183347. This drive apparatus comprises an engine and an electric power generator disposed on a first axis, an electric motor disposed on a second axis, a countershaft disposed on a third axis, and a differential device disposed on a fourth axis. The engine and the electric power generator are connected to a countershaft through a differential gear device. FIG. 7 depicts actual positional relationships for this apparatus. The electric motor and the differential device are directly connected to the countershaft. Therefore, the gear ratio of a pair of gears connecting the engine and the countershaft and the gear ratio of a pair of gears connecting the electric motor and the countershaft can be arbitrarily set independently of each other.

With regard to engines, it is often the case that power train requirements vary depending on vehicle orientation. For the fuel economy-oriented vehicle, the total gear ratio from the engine to wheels is usually set to a relatively high value for optimal economy. For the accelerating performance-oriented vehicle, the total gear ratio from the engine to the wheels is usually set to a relatively low value for optimal performance. To meet these vehicular requirements in the aforementioned hybrid drive apparatus, the total gear ratio from the engine to the wheels may be selected or changed by selecting or changing the diameters for each of the gears connecting the differential gear device and the countershaft, that is, by changing the diameter of a drive gear a on a first axis I and a driven gear b on a third axis III as indicated by broken lines in FIG. 7. However, in FIG. 7, such changes in the total gear ratio from the engine to the wheels require changes in the diameters of the pair of gears connecting the electric motor and the countershaft. This must be accomplished by appropriately selecting diameters for a drive gear c on a second axis II and the driven gear b on the third axis III. Thus, the electric motor to wheel gear ratio is automatically affected. This is a significant disadvantage. Furthermore, as the diameter of the drive gear a is changed to a gear a' shown in FIG. 7, the inter-axis distance between the countershaft on the third axis III and the differential device on a fourth axis IV changes as indicated by axis III' in FIG. 7. Therefore, the shape of a housing surrounding this arrangement must also be changed.

Finally, as the drive gears a, c mesh with the same tooth face of the common counter driven gear b, a tooth face precision of the drive gear a with respect to the counter driven gear b and a tooth face precision of the drive gear c with respect to the driven gear b must be simultaneously achieved in order to avoid unacceptable gear noise. Therefore, a great number of man-hours must be consumed to meet the precision requirements for this apparatus.

SUMMARY OF THE INVENTION

Accordingly, a first object of the invention is to provide a hybrid drive apparatus that allows a change in the overall gear ratio between the engine and the countershaft without necessitating a change in the gear ratio between the motor and the countershaft.

A second object of the invention is to separately provide a hybrid drive apparatus that allows a change in the gear ratio between the motor and the countershaft without necessitating a change in the gear ratio between the engine and the countershaft.

A third object of the invention is to separately provide a hybrid four-axis drive apparatus that makes it possible to arbitrarily set and change an engine-side total gear ratio and, if necessary, an electric motor-side total gear ratio without necessitating a change in the positions of any of the axes.

In accordance with a first aspect of the invention, a hybrid drive apparatus includes an engine and an electric power electric power generator that are disposed on a first axis, an electric motor disposed on a second axis, a countershaft disposed on a third axis, and a differential device disposed on a fourth axis. The engine and the electric power generator are connected to the countershaft via a differential gear device, and the electric motor and the differential device are directly connected to the countershaft. The differential gear device and the countershaft are connected by a first pair of gears that mesh with each other, and the electric motor and the countershaft are connected by a second pair of gears that mesh with each other, and the countershaft and the differential device are connected by a third pair of gears that mesh with each other.

In this hybrid drive apparatus, the power transmission from the engine side to the countershaft through the first pair of gears and the power transmission from the electric motor side to the countershaft through the second pair of gears are performed in different paths with respect to the countershaft. Therefore, the output from the engine side and the output from the electric motor can be completely independent from each other, and the total gear ratios on the two sides to the differential device can be freely set. Furthermore, when the gear ratios on the two sides are selected or changed, it is unnecessary to change the inter-axis distances between the four axes. As a result, the same casing can be used before and after the gear ratio settings are changed.

In accordance with a second aspect of the invention, a hybrid drive apparatus includes an engine and an electric power generator that are disposed on a first axis, an electric motor disposed on a second axis, a countershaft disposed on a third axis, and a differential device disposed on a fourth axis. The engine and the electric power generator are connected to the countershaft through a differential gear device, and each of the electric motor and the differential device is directly connected to the countershaft. The electric motor is connected to the countershaft through a speed reducing mechanism disposed on the second axis, and the differential device is directly connected to the countershaft. The differential gear device and the countershaft are connected by a first pair of gears that mesh with each other, and the electric motor and the countershaft are connected by a second pair of gears that mesh with each other, and the countershaft and the differential device are connected by a third pair of gears that mesh with each other.

In this hybrid drive apparatus, the power transmission from the engine side to the countershaft through the first pair of gears and the power transmission from the electric motor to the countershaft through the second pair of gears are performed in different paths with respect to the countershaft. Therefore, the output from the engine side and the output from the electric motor can be completely independent from each other. Hence, the total gear ratio from the engine side to the differential device can be freely set without affecting the gear ratio from the motor to the differential device. By changing the gear ratio of the speed reducing mechanism, the gear ratio on the electric motor side can be changed without affecting the total gear ratio of the path from the engine side to the differential device. Furthermore, it is unnecessary to change the inter-axis distances between the four axes when the gear ratios on the two sides are selected or changed. As a result, the same casing can be used before and after the gear ratio settings are changed.

In accordance with a third aspect of the invention, a hybrid drive apparatus includes an engine, an electric power generator and an electric motor that are disposed on a first axis, a countershaft disposed on a third axis, and a differential device disposed on a fourth axis. The engine and the electric power generator are connected to the countershaft through a differential gear device, and the electric motor and the differential device are directly connected to the countershaft. The differential gear device and the countershaft are connected by a first pair of gears that mesh with each other, and the electric motor and the countershaft are connected by a second pair of gears that mesh with each other, and the countershaft and the differential device are connected by a third pair of gears that mesh with each other.

In this hybrid drive apparatus, the power transmission from the engine side to the countershaft by the first pair of gears and the power transmission from the electric motor side to the countershaft by the second pair of gears are performed in different paths with respect to the countershaft. Therefore, the output from the engine side and the output from the electric motor can be completely independent from each other, and the total gear ratios from the engine and motor to the differential device can be freely and independently set. Furthermore, when the gear ratios on the two sides are selected or changed, it is unnecessary to change the inter-axis distances between the three axes. As a result, the same housing may be used before and after the gear ratio settings are changed.

In the hybrid drive apparatus of the first and second aspects of the invention, each of the first, second and third pairs of gears may be formed by two gears disposed at different positions along an axis of the countershaft. In this aspect of the invention, each of the gears meshes with only one other gear. Therefore, the structure is advantageous in reducing the gear noise, and the man-hours for processing the gears can be reduced.

Furthermore, in the invention, the second and third pairs of gears may be formed by three gears consisting of a common gear on the countershaft, and an electric motor-side gear and a differential device-side gear that mesh with the common gear at different positions in a direction of an axis.

In this structure, a gear connecting the electric motor and the countershaft and a gear connecting the countershaft and the differential device are one and the same gear. However, due to the mesh positions shifted from each other in the direction of the axis, the common gear can have different tooth faces. Therefore, this structure, too, is advantageous in reducing the gear noise, and the man-hours for processing the gears can be reduced.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
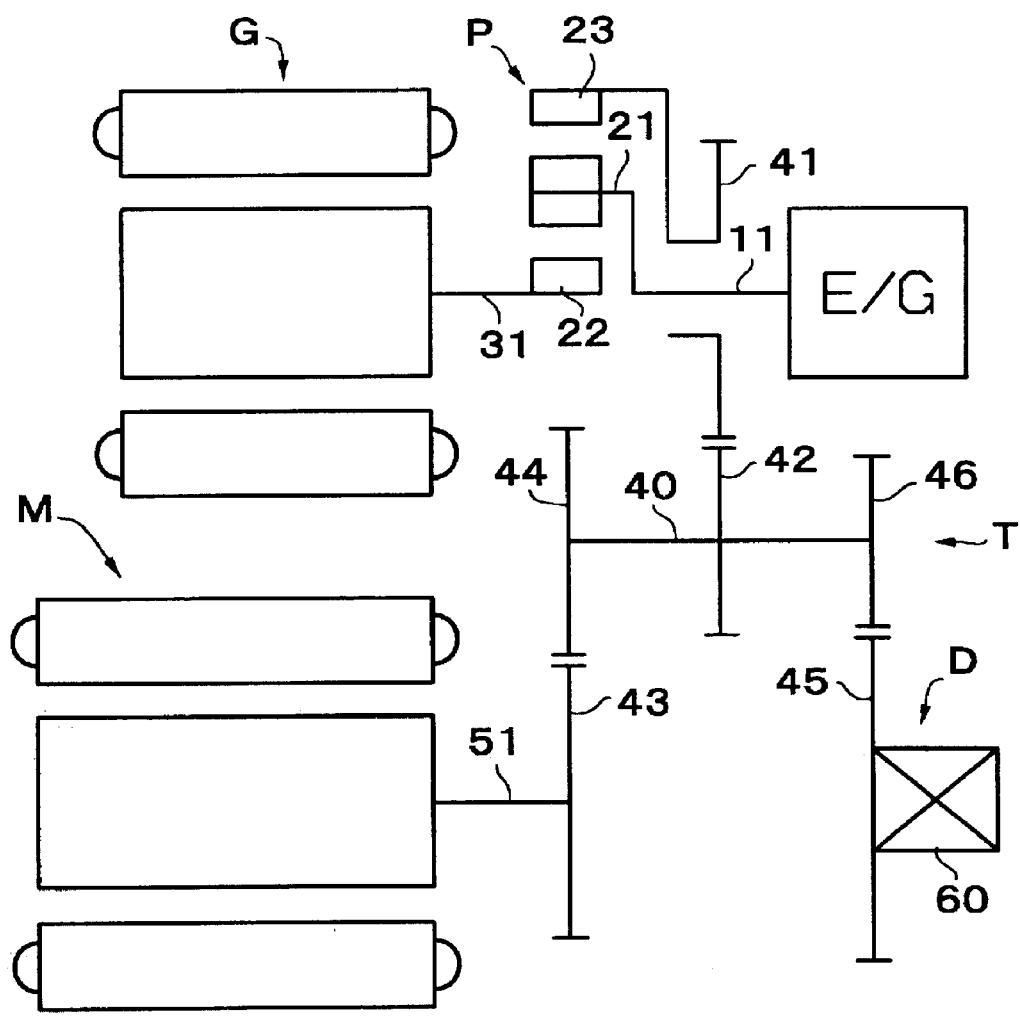
FIG. 1 is a schematic diagram of a hybrid four-axis drive apparatus according to a first embodiment of the invention.

Preferred embodiments of the invention will be described hereinafter with reference to the drawings. FIG. 1 shows a power train of a hybrid four-axis drive apparatus of a first embodiment to which the invention is applied, in a schematic diagram where inter-axis relationships are expanded. This apparatus has an engine E/G, an electric motor (hereinafter, referred to as "motor") M, an electric power generator (hereinafter, referred to as "generator") G, and a differential device D as main component elements. A differential gear device P, formed by a single pinion-type planetary gear set, and a counter gear mechanism T are provided between the main component elements.

Figure 2:
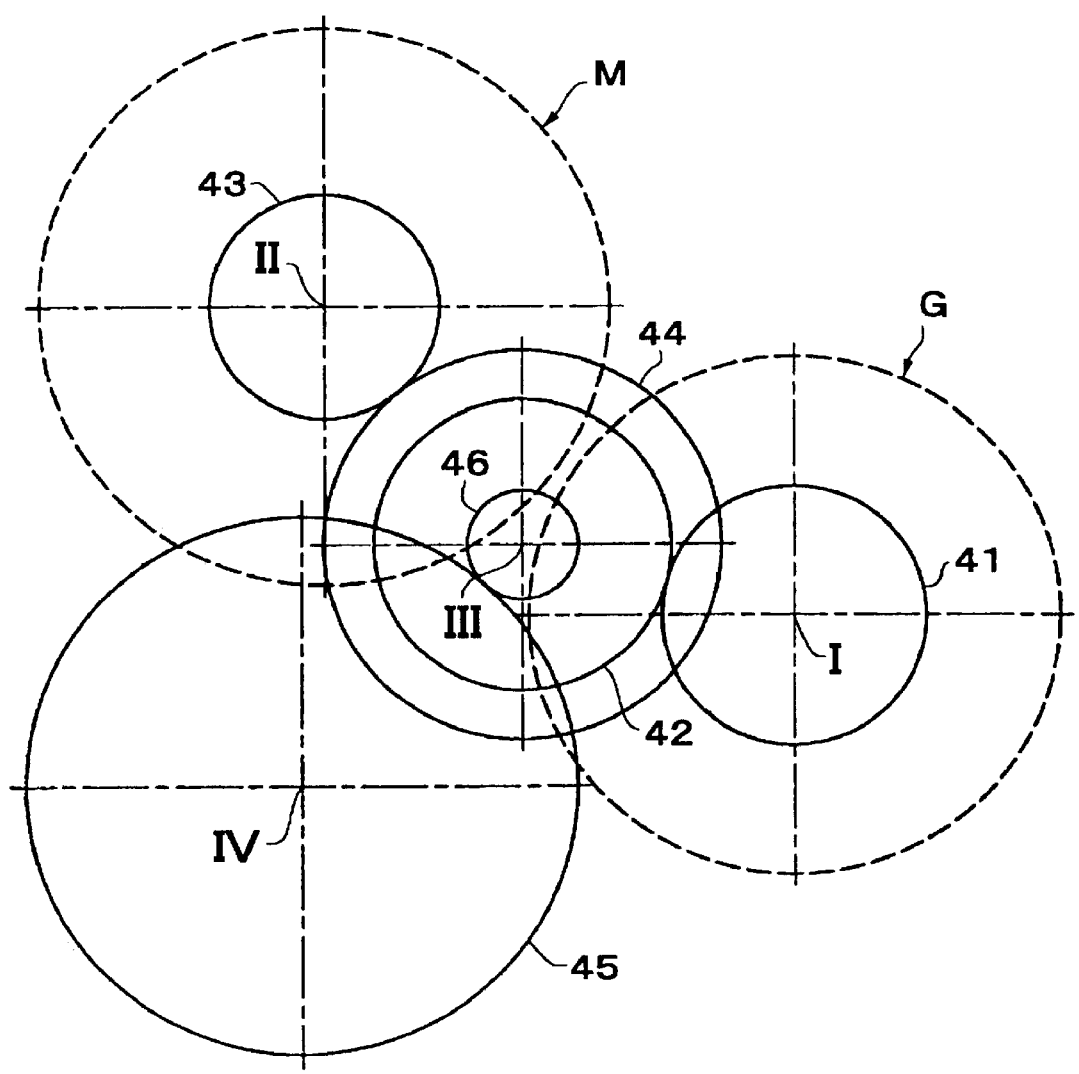
FIG. 2 is a diagram indicating the relationships of meshes between gears on a counter shaft of a drive apparatus of the first embodiment.

As indicated in FIG. 2, in which an actual positional relationships among axes are indicated, the drive apparatus has a four-axis construction as follows. The engine E/G and the generator G are disposed on a first axis I, the motor M is disposed on a second axis II, a countershaft 40 is disposed on a third axis III, and the differential device D is disposed on a fourth axis IV. The four axes are parallel to one another. The engine E/G and the generator G are connected to the countershaft 40 through the differential gear device P. The motor M and the differential device D are directly connected to the countershaft 40 through gear combinations 43, 44 and 45, 46 respectively.

Further detailed description will be made with reference to FIG. 1. The engine E/G is connected to the generator G and the counter gear mechanism T by connecting an output shaft 11 of the engine E/G to a carrier 21 of the differential gear device P. The generator G is connected to the engine E/G and the counter gear mechanism T by connecting a rotor shaft 31 of the generator G to a sun gear 22 of the differential gear device P. A ring gear 23 of the differential gear device P is connected to a first axis-side counter drive gear 41 that is a member of a first pair of gears. A gear on the third axis III which is the other member of the first pair of gears is formed by a counter driven gear 42 that is fixed to the countershaft 40 and that meshes with the counter drive gear 41.

The motor M and the countershaft 40 are directly connected by a second pair of gears. More specifically, a counter drive gear 43 on the second axis II that is fixed to a rotor shaft 51 of the motor M meshes with a counter driven gear 44 on the third axis III that is fixed to the countershaft 40 to form the second pair of gears and to connect the rotor shaft 51 and the countershaft 40.

The countershaft 40 and the differential device D are directly connected by a third pair of gears. More specifically, a differential drive pinion gear 46, on the third axis III, is fixed to the countershaft 40 and a differential ring gear 45, on the fourth axis IV, is fixed to a differential case 60 of the differential device D and meshes with the differential drive pinion gear 46 to form the third pair of gears and to connect the countershaft 40 and the differential device D. The differential device D is connected to wheels by methods well know in the industry.

In the hybrid four-axis drive apparatus having the above-described configuration, the motor M and the wheels have a directly connected relationship in terms of power transmission although they have a speed reduction relationship corresponding to the gear ratios of the second and third pairs of gears since the countershaft 40 is interposed therebetween. In contrast to the motor M, the engine E/G and the generator G are connected to each other and to the countershaft 40 through the differential gear device P, thus having an indirectly connected relationship in terms of power transmission. Therefore, by adjusting the power generation load of the generator G with respect to the ring gear 23, which receives vehicle running load through the differential device D and the countershaft 40, one may achieve a vehicle running mode in which the proportion of the engine output used for drive power from engine output and the proportion of engine output used for electric power generation are appropriately adjusted. Furthermore, the reaction force on the carrier 21 reverses when the generator G is driven as a motor. Therefore, if in that case, the carrier 21 is stopped and engaged with the drive apparatus housing by appropriate means (not shown), the output of the generator G, which is now acting as a motor, can be transmitted to the ring gear 23. Thus, it is possible to achieve enhancement of the drive power at the time of a start of the vehicle based on simultaneous outputs from the motor M and the generator G (parallel mode running).

Next described will be the changing of the engine-side gear ratio. As shown in FIG. 2, which illustrates the actual positions of the four axes and the gear mesh relationships, the first pair of gears formed by the counter drive gear 41 and the counter driven gear 42, which have a predetermined gear ratio, is provided as a pair of gears separate and independent from the second pair of gears formed by the counter drive gear 43 and the counter driven gear 44, which have a predetermined gear ratio that is normally different from the gear ratio of the first pair of gears. Therefore, when the diameter of the counter drive gear 41 is changed in accordance with a gear ratio change requirement, the diameter of the counter driven gear 42 needs to be changed as well. However, no change is needed in the diameters of the pair of the counter drive gear 43 and the counter driven gear 44. The same applies to the relationship of the pair of the differential drive pinion gear 46 and the differential ring gear 45. Furthermore, since the changing of the gear ratio does not affect the other pairs of gears as mentioned above, the position of the countershaft 40 remains unchanged.

Therefore, according to this drive apparatus, the output on the engine E/G side and the output on the motor M side are completely independent from each other, so that the engine-side gear ratio can be freely set. At the time of such setting, the inter-axis distance does not change, so that one and the same housing may be used for any engine-side gear ratio setting. Furthermore, the motor-side gear ratio can also be freely set and changed in accordance with need, although such need is, in reality, rare. Furthermore, since each gear constitutes a pair on a one-to-one basis, each gear meshes with only one-other gear. Therefore, the drive apparatus is advantageous in terms of gear noise, and allows a reduction in the man-hours devoted to gear face precision.

Figure 3:
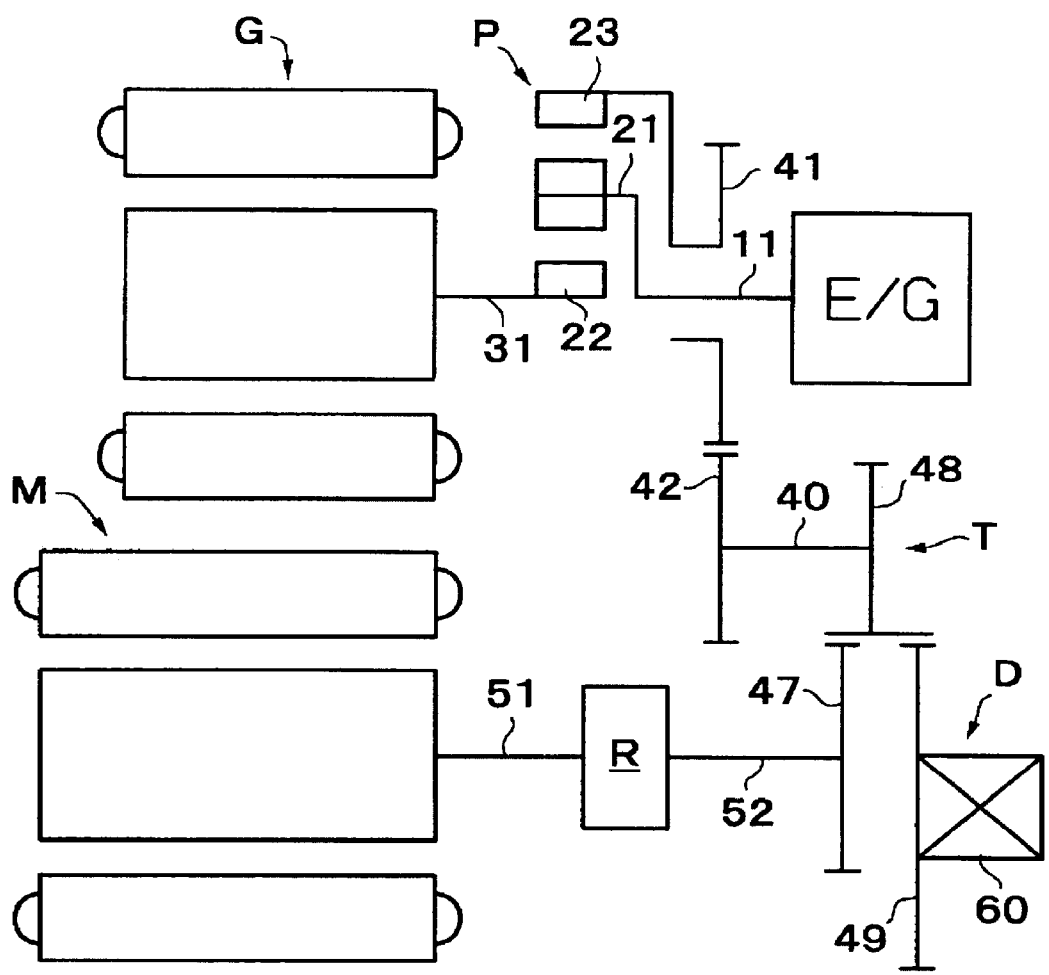
FIG. 3 is a schematic diagram of a hybrid four-axis drive apparatus according to a second embodiment of the invention.
Figure 4:
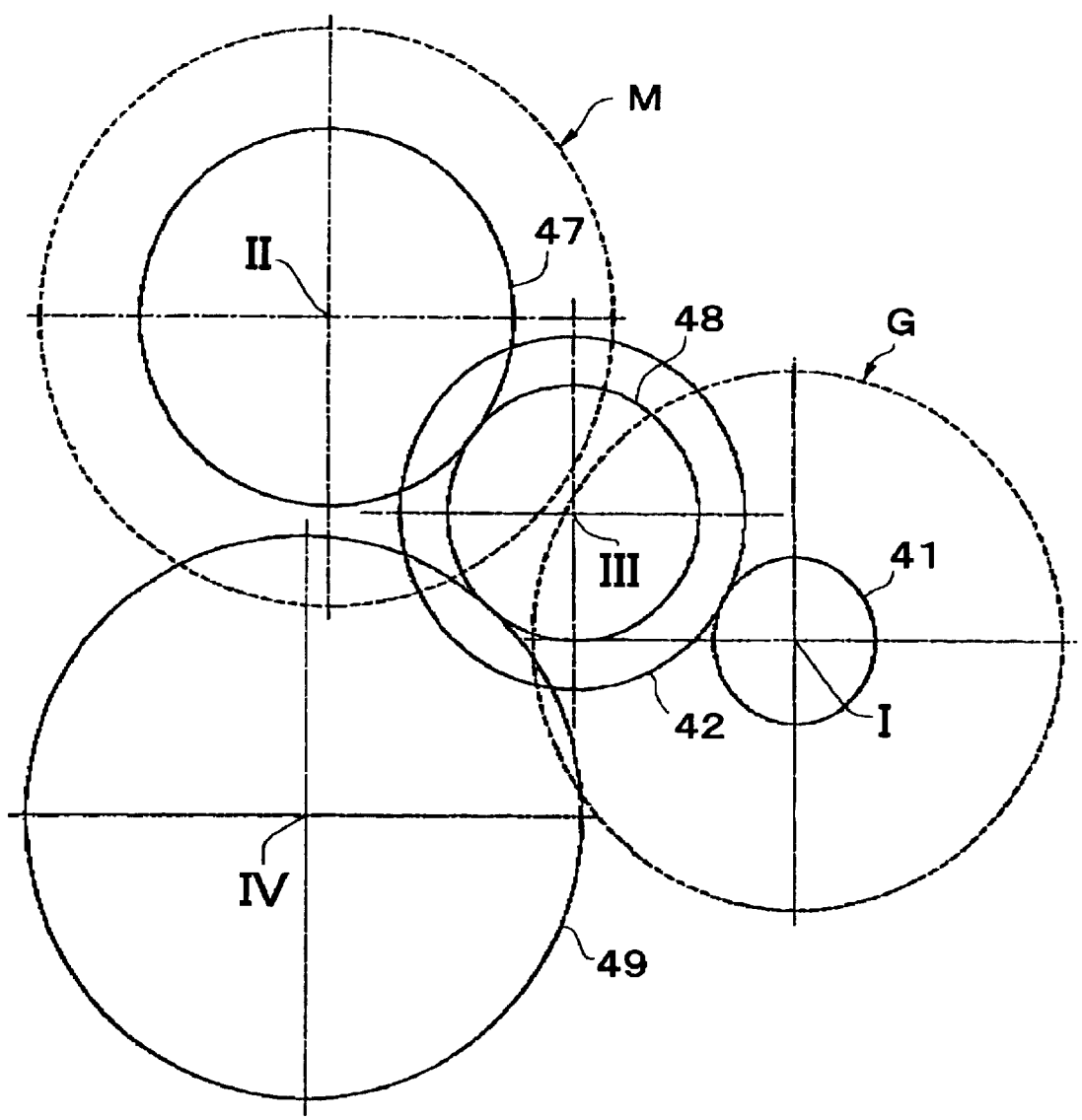
FIG. 4 is a diagram indicating the relationships of meshes between gears on a counter shaft of a drive apparatus of the second embodiment.

Next, FIGS. 3 and 4 illustrate a second embodiment of a hybrid drive apparatus to which the invention is applied, in techniques similar to the techniques employed to illustrate the first embodiment. In this embodiment, a motor M is connected to a countershaft 40 by a speed reducing mechanism R, such as a planetary gear set and the like, disposed on a second axis that is coaxial with a rotor shaft 51 of the motor M. An output shaft 52 of the speed reducing mechanism R and the countershaft 40 are connected by a counter drive gear 47 and a gear 48 that are fixed to the output shaft 52 and the countershaft 40 and that mesh with each other. A differential device D is connected to the countershaft 40 by meshing a differential ring gear 49 of the differential device D with the gear 48 at a position in a direction of axis III that is different from the position of mesh for the counter drive gear 47 with the gear 48. Therefore, in this structure, the gear 48 functions as a driven gear with respect to the counter drive gear 47. With respect to the differential ring gear 49, the gear 48 functions as a pinion gear that drives the differential ring gear 49. The counter drive gear 47 and the common gear 48 form a second pair of gears. The differential ring gear 49 and the common gear 48 form a third pair of gears. The structures of this embodiment are, otherwise, substantially the same as those of the first embodiment. The elements described are represented by the same reference characters in the drawings and will not be described again.

In the above-described configuration, the first pair of gears formed by the counter drive gear 41 and the counter driven gear 42, have a predetermined gear ratio, that is independent of a predetermined gear ratio of the second pair of gears formed by the counter drive gear 47 and the common gear 48. Therefore, when the diameter of the counter drive gear 41 is changed in accordance with a gear ratio change requirement, a diameter change is needed for the counter driven gear 42 meshing with the counter drive gear 41 whereas no diameter change is needed for the pair of the counter drive gear 47 and the common gear 48. This also applies to the relationship between the pair of the common gear 48 and the differential ring gear 49. In this case, the changing of the gear ratio has no effect on the other pairs of gears, and the position of the countershaft 40 remains unchanged, as mentioned above.

Therefore, this drive apparatus achieves advantages similar to those of the first embodiment. Unlike the first embodiment, each gear does not necessarily constitute a pair on a one-to-one basis in this case. However, the mesh positions of the two gears 48, 49 forming pairs with the common gear 48 are shifted from each other along axis III. Thus gear noise may be controlled through a method in which the common gear 48 is formed by a combination of separately formed gears, or a method in which different tooth shapes are formed at the mesh positions on the common gear 48 by separate forming processes, etc.

Figure 5:
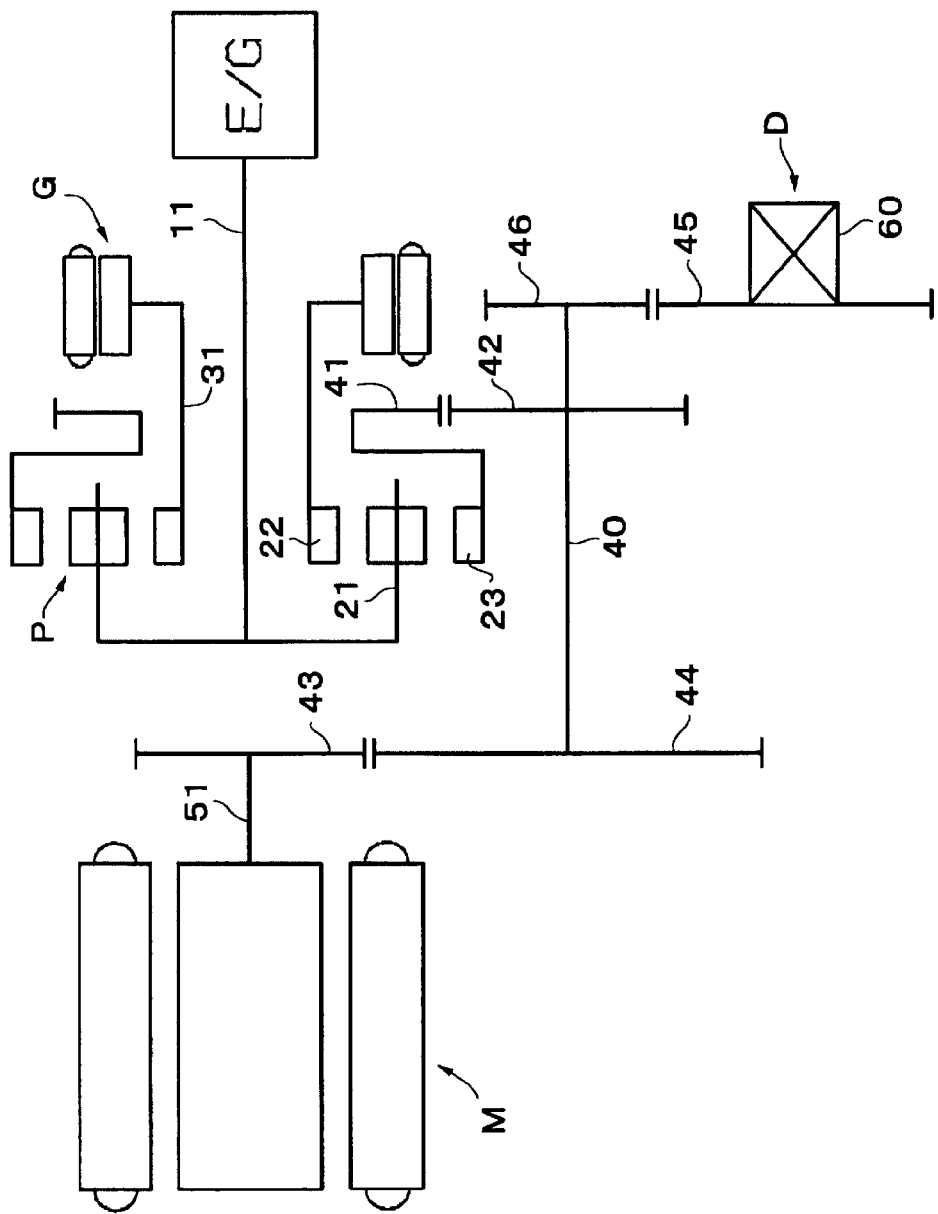
FIG. 5 is a schematic diagram of a hybrid four-axis drive apparatus according to a third embodiment of the invention.
Figure 6:
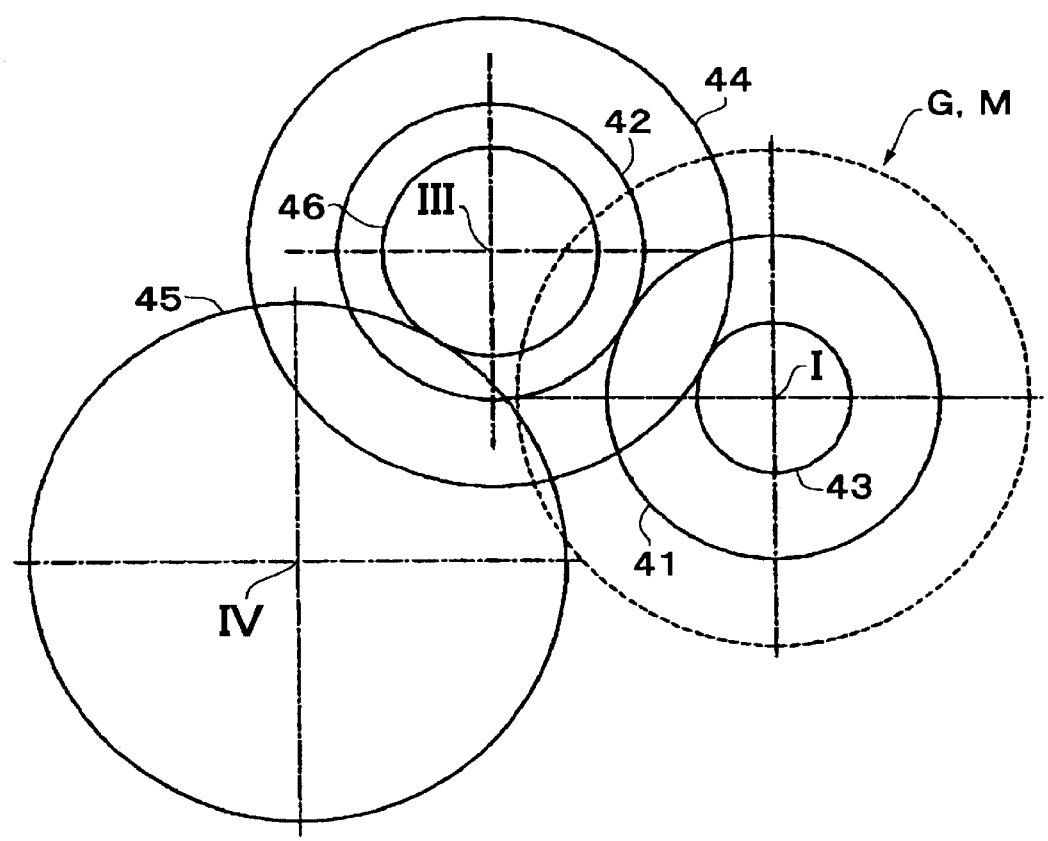
FIG. 6 is a diagram indicating the relationships of meshes between gears on a counter shaft of a drive apparatus of the third embodiment.
Figure 7:
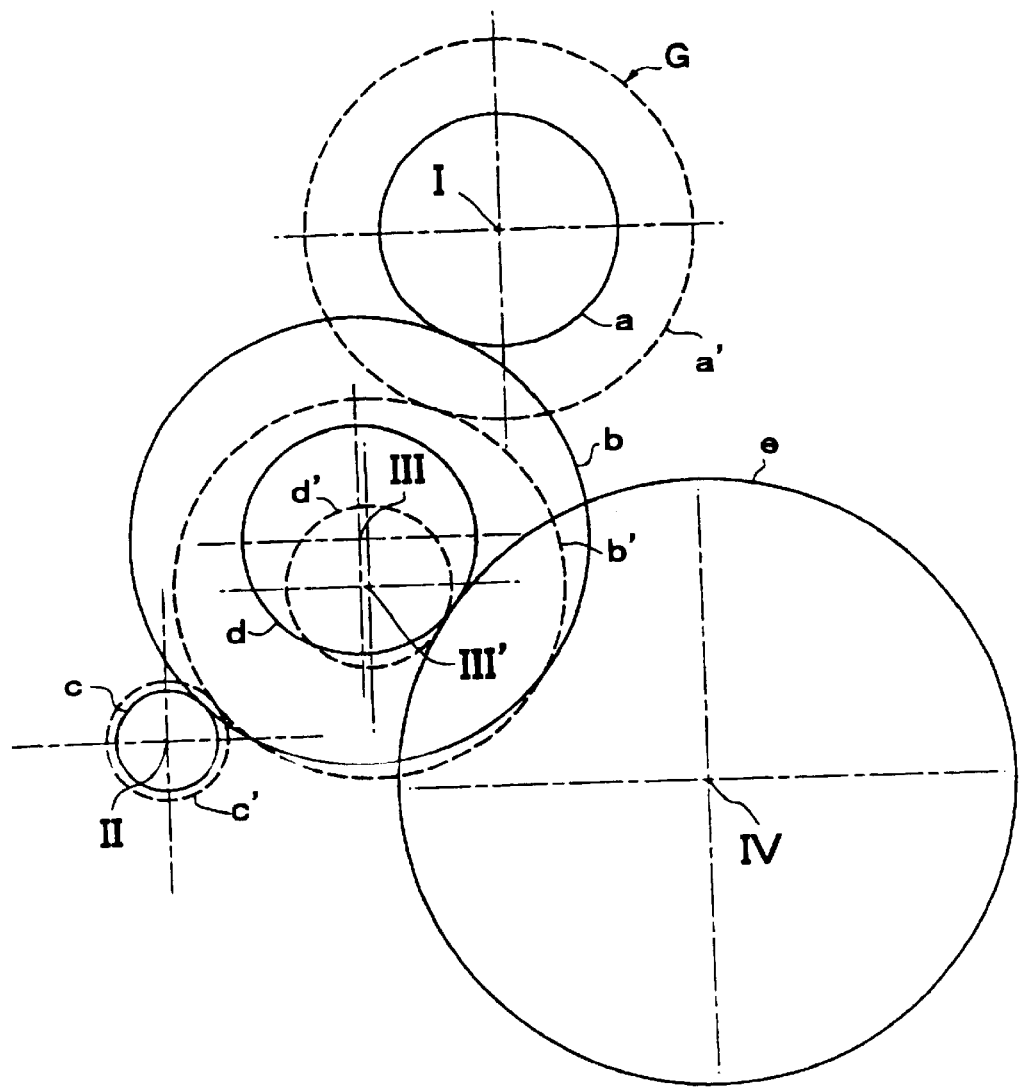
FIG. 7 is a diagram indicating the relationships of meshes between gears on a counter shaft of a conventional drive apparatus.

Next, FIGS. 5 and 6 illustrate a third embodiment of a hybrid drive apparatus to which the invention is applied, in techniques similar to those employed to illustrate the first and second embodiments. This embodiment differs from the first embodiment only in that an engine E/G, a generator G and a motor M are disposed on a first axis I, a countershaft 40 is disposed on a third axis III (a term "second axis" is avoided in the description of this embodiment to avoid confusion with the other embodiments), and a differential device D is disposed on a fourth axis IV, the three axes being parallel to one another. The connection relationships of the engine E/G and the generator G to the countershaft 40, and the connection relationship between the motor M and the differential device D are substantially the same as those in the first embodiment. Therefore, other parts are represented by the same reference characters in the drawings, and will not be described again.

As indicated by the drive connection relationships, the third embodiment achieves advantages substantially the same as those stated above in conjunction with the first embodiment.

While the invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. A hybrid drive apparatus, comprising:
   an engine and an electric power generator that are disposed on a first axis;
   an electric motor disposed on a second axis;
   a countershaft disposed on a third axis; and
   a differential device disposed on a fourth axis, wherein the engine and the electric power generator are connected to the countershaft via a differential gear device, the electric motor and the differential device are directly connected to the countershaft, the differential gear device and the countershaft are connected by a first pair of gears that mesh with each other, the electric motor and the countershaft are connected by a second pair of gears that mesh with each other, and the countershaft and the differential device are connected by a third pair of gears that mesh with each other, wherein each of the first to third pairs of gears is formed by two gears disposed at different positions along an axis of the countershaft.

2. A hybrid drive apparatus, comprising:
   an engine and an electric power generator that are disposed on a first axis;
   an electric motor disposed on a second axis;
   a countershaft disposed on a third axis; and
   a differential device disposed on a fourth axis, wherein the engine and the electric power generator are connected to the countershaft via a differential gear device, the electric motor and the differential device are directly connected to the countershaft, the differential gear device and the countershaft are connected by a first pair of gears that mesh with each other, the electric motor and the countershaft are connected by a second pair of gears that mesh with each other, and the countershaft and the differential device are connected by a third pair of gears that mesh with each other, wherein the second and third pairs of gears are formed by three gears consisting of a common gear on the countershaft, and an electric motor-side gear and a differential device-side gear that mesh with the common gear.

3. A hybrid drive apparatus, comprising:
   an engine and an electric power generator that are disposed on a first axis;
   an electric motor disposed on a second axis;
   a countershaft disposed on a third axis; and
   a differential device disposed on a fourth axis, wherein the engine and the electric power generator are connected to the countershaft via a differential gear device, each of the electric motor and the differential device is connected to the countershaft, the electric motor is connected to the countershaft via a speed reducing mechanism disposed on the second axis, the differential device is directly connected to the countershaft, the differential gear device and the countershaft are connected by a first pair of gears that mesh with each other, the electric motor and the countershaft are connected by a second pair of gears that mesh with each other, and the countershaft and the differential device are connected by a third pair of gears that mesh with each other, wherein each of the first to third pairs of gears is formed by two gears disposed at different positions along an axis of the countershaft.

4. A hybrid drive apparatus, comprising:
   an engine and an electric power generator that are disposed on a first axis;
   an electric motor disposed on a second axis;
   a countershaft disposed on a third axis; and
   a differential device disposed on a fourth axis, wherein the engine and the electric power generator are connected to the countershaft via a differential gear device, each of the electric motor and the differential device is connected to the countershaft, the electric motor is connected to the countershaft via a speed reducing mechanism disposed on the second axis, the differential device is directly connected to the countershaft, the differential gear device and the countershaft are connected by a first pair of gears that mesh with each other, the electric motor and the countershaft are connected by a second pair of gears that mesh with each other, and the countershaft and the differential device are connected by a third pair of gears that mesh with each other, wherein the second and third pairs of gears are formed by three gears consisting of a common gear on the countershaft, and an electric motor-side gear and a differential device-side gear that mesh with the common gear.

5. A hybrid drive apparatus, comprising:
   an engine, an electric power generator and an electric motor that are disposed on a first axis;
   a countershaft disposed on a third axis; and
   a differential device disposed on a fourth axis, wherein the engine and the electric power generator are connected to the countershaft via a differential gear device, the electric motor and the differential device are directly connected to the countershaft, the differential gear device and the countershaft are connected by a first pair of gears that mesh with each other, the electric motor and the countershaft are connected by a second pair of gears that mesh with each other, and the countershaft and the differential device are connected by a third pair of gears that mesh with each other, wherein each of the first to third pairs of gears is formed by two gears disposed at different positions along an axis of the countershaft.

6. A hybrid drive apparatus, comprising:

an engine;

an electric power generator;

an electric motor, at least one of the engine, the electric power generator, and the electric motor disposed on a first axis;

a countershaft disposed on a second axis; and a differential device disposed on a third axis, wherein the engine and the electric power generator are connected to the countershaft via a differential gear device, the electric motor and the differential device are directly connected to the countershaft, the differential gear device and the countershaft are connected by a first pair of gears that mesh with each other, the electric motor and the countershaft are connected by a second pair of gears that mesh with each other, and the countershaft and the differential device are connected by a third pair of gears that mesh with each other, wherein each of the first to third pairs of gears is formed by at least two gears disposed at different positions along an axis of the countershaft.

7. A hybrid drive apparatus according to claim 6, wherein the engine, the electric power generator, and the differential gear device are disposed on the first axis and the electric motor is disposed on a fourth axis.

8. A hybrid drive apparatus according to claim 6, wherein the engine, the electric power generator, the electric motor, and the differential gear device are disposed on the first axis.

9. A hybrid drive apparatus, comprising:

an engine;

an electric power generator;

an electric motor, at least two of the engine, the electric power generator and the electric motor disposed on a first axis;

a countershaft disposed on a second axis; and a differential device disposed on a third axis, wherein the engine and the electric power generator are connected to the countershaft via a differential gear device, the electric motor and the differential device are directly connected to the countershaft, the differential gear device and the countershaft are connected by a first pair of gears that mesh with each other, the electric motor and the countershaft are connected by a second pair of gears that mesh with each other, and the countershaft and the differential device are connected by a third pair of gears that mesh with each other, wherein the second and third pairs of gears are formed by at least three gears consisting of a common gear on the countershaft, and an electric motor-side gear and a differential device-side gear that mesh with the common gear.

10. A hybrid drive apparatus according to claim 9, wherein the engine and the electric power generator, and the differential gear device are disposed on the first axis and the electric motor is disposed on a fourth axis.

11. A hybrid drive apparatus according to claim 9, wherein the electric motor and a speed reducing mechanism are disposed on a same axis and the electric motor is connected to the countershaft via the speed reducing mechanism.

12. A drive apparatus for a hybrid vehicle, comprising:

an electric power generator;

an electric motor, at least one of the electric power generator and the electric motor disposed on a first axis;

a countershaft disposed on a second axis; and a differential device disposed on a third axis, wherein the electric power generator is connected to the countershaft via a differential gear device, the electric motor and the differential device are directly connected to the countershaft, the differential gear device and the countershaft are connected by a first pair of gears that mesh with each other, the electric motor and the countershaft are connected by a second pair of gears that mesh with each other, and the countershaft and the differential device are connected by a third pair of gears that mesh with each other, wherein each of the first to third pairs of gears is formed by at least two gears disposed at different positions along an axis of the countershaft.

13. A drive apparatus according to claim 12, wherein the electric power generator and the differential gear device are disposed on the first axis and the electric motor is disposed on a fourth axis.

14. A drive apparatus according to claim 12, wherein the electric power generator, the electric motor, and the differential gear device are disposed on the first axis.

15. A drive apparatus for a hybrid vehicle, comprising:

an electric power generator;

an electric motor, at least one of the electric power generator and the electric motor disposed on a first axis;

a countershaft disposed on a second axis; and a differential device disposed on a third axis, wherein the electric power generator is connected to the countershaft via a differential gear device, the electric motor and the differential device are directly connected to the countershaft, the differential gear device and the countershaft are connected by a first pair of gears that mesh with each other, the electric motor and the countershaft are connected by a second pair of gears that mesh with each other, and the countershaft and the differential device are connected by a third pair of gears that mesh with each other, wherein the second and third pairs of gears are formed by at least three gears consisting of a common gear on the countershaft, and an electric motor-side gear and a differential device-side gear that mesh with the common gear.

16. A drive apparatus according to claim 15, wherein the electric power generator and the differential gear device are disposed on the first axis and the electric motor is disposed on a fourth axis.

17. A drive apparatus according to claim 15, wherein the electric motor and a speed reducing mechanism are disposed on a same axis and the electric motor is connected to the countershaft via the speed reducing mechanism.

* * * * *